(12) United States Patent
Soulie et al.

(10) Patent No.: US 8,831,863 B2
(45) Date of Patent: Sep. 9, 2014

(54) METHOD FOR TRACKING MOVING ENTITIES

(75) Inventors: Antoine Soulie, Paris (FR); Francis Pinault, Bois-Colombes (FR)

(73) Assignee: Alcatel Lucent, Boulogne Billancourt (FR)

( * ) Notice: Subject to any disclaimer, the term of this patent is extended or adjusted under 35 U.S.C. 154(b) by 1655 days.

(21) Appl. No.: 12/170,831

(22) Filed: Jul. 10, 2008

(65) Prior Publication Data

US 2009/0040237 A1    Feb. 12, 2009

(30) Foreign Application Priority Data

Jul. 11, 2007    (EP) .................................... 07290870

(51) Int. Cl.
*G08G 1/00*      (2006.01)
*G06G 7/76*      (2006.01)

(52) U.S. Cl.
USPC ........... 701/117; 345/428; 345/642; 345/643; 382/291; 382/216

(58) Field of Classification Search
USPC ........... 701/988–990, 951.1, 955.17–21, 201, 701/117; 345/642–643, 428; 715/850, 846, 715/764; 342/457, 20; 340/438, 425.5; 382/216, 291
See application file for complete search history.

(56) References Cited

U.S. PATENT DOCUMENTS

| | | | | |
|---|---|---|---|---|
| 4,255,789 A * | 3/1981 | Hartford et al. | ............... | 701/108 |
| 5,367,615 A * | 11/1994 | Economy et al. | ............. | 345/441 |
| 5,450,329 A * | 9/1995 | Tanner | ........................... | 701/213 |
| 6,718,261 B2 * | 4/2004 | Mattheyses et al. | .......... | 701/202 |
| 7,016,539 B1 * | 3/2006 | Silver et al. | .................... | 382/216 |
| 7,576,679 B1 * | 8/2009 | Orr et al. | ......................... | 342/20 |
| 2002/0013675 A1 * | 1/2002 | Knoll et al. | .................... | 702/150 |
| 2003/0229442 A1 * | 12/2003 | Mattheyses et al. | .......... | 701/202 |
| 2004/0150668 A1 * | 8/2004 | Myers et al. | ................... | 345/771 |
| 2006/0129309 A1 * | 6/2006 | Alewine et al. | ............... | 701/200 |
| 2006/0184519 A1 * | 8/2006 | Smartt | ............................. | 707/3 |
| 2006/0293840 A1 * | 12/2006 | Klein | ............................. | 701/201 |
| 2007/0246209 A1 * | 10/2007 | Lee et al. | ....................... | 165/202 |
| 2008/0169914 A1 * | 7/2008 | Albertson et al. | ............ | 340/438 |
| 2009/0024267 A1 * | 1/2009 | Kawai | .............................. | 701/22 |

FOREIGN PATENT DOCUMENTS

| | | | |
|---|---|---|---|
| AU | 2003243130 A8 | * | 10/2005 |
| CN | 1969171 A | * | 5/2007 |
| EP | 1757904 A1 | | 2/2007 |
| WO | 9517685 | | 6/1995 |

(Continued)

OTHER PUBLICATIONS

Donohue, G. and A. Yousefi, 2004, Temporal & Spatial Distribution of Airspace Complexity for New Methodologies in Airspace Design, Proceedings of the 4th Aviation Technology, Integration, and Operation (ATIO) Conference, AIAA, Chicago, Ill.*

(Continued)

*Primary Examiner* — Cuong H Nguyen
(74) *Attorney, Agent, or Firm* — Wolff & Samson, PC

(57) ABSTRACT

Method for tracking entities (2) evolving in a monitored space having a metrics with at least one predetermined granularity, said method including repetition of the following operations:
determining a current spatial and/or temporal state of the entities (2) within said space, according to said metrics,
checking occurrence of a triggering event in connection with said state,
upon occurrence of said triggering event, changing granularity of the monitored space for at least one entity (2).

17 Claims, 4 Drawing Sheets

(56) References Cited

FOREIGN PATENT DOCUMENTS

| WO | WO 9517685 A1 * | 6/1995 |
| WO | 03094082 A2 | 11/2003 |
| WO | WO 03094082 A2 * | 11/2003 |

OTHER PUBLICATIONS

Donohue, G., A. Yousefi, and K. Qureshi, 2003, Investigation of Enroute Metrics for Model Validation and Airspace Design Using TAAM, 5th Eurocontrol/FAA ATM R&D Seminar, Budapest, Hungary.*

Selection of range and azimuth angle parameters for a forward looking collision warning radar sensor; Kenue, S.K.; Intelligent Vehicles '95 Symposium., Proceedings of the; Digital Object Identifier: 10.1109/IVS.1995.528331 Publication Year: 1995 , pp. 494-499.*

Sensor inter-vehicle communication for safer highways; Durresi, M.; Durresi, A.; Barolli, L.; Advanced Information Networking and Applications, 2005. AINA 2005. 19th International Conference on; vol. 2; Digital Object Identifier: 10.1109/AINA.2005.308 Publication Year: 2005 , pp. 599-604 vol. 2.*

GPSenseCar—A Collision Avoidance Support System Using Real-Time GPS Data in a Mobile Vehicular Network; Yin-Jun Chen; Ching-Chung Chen; Shou-Nian Wang; Han-En Lin; Hsu, R.C.;Systems and Networks Communications, 2006. ICSNC '06. International Conference on; Digital Object Identifier: 10.1109/ICSNC. 2006.41; Publication Year: 2006 , p. 71.*

J-function based geometric reasoning for robotics. I. A new distance measure for collision detection and grasping; Xiong You Lun; Xiong Xiao Rong; Systems, Man and Cybernetics, 1995. Intelligent Systems for the 21st Century., IEEE Inter.l Conf. on; vol. 1; Digital Object Identifier: 10.1109/ICSMC.1995.537781; Pub. Year: 1995, pp. 334-339 vol. 1.*

A Logical Formulation of Probabilistic Spatial Databases; Austin Parker et al., IEEE Transactions on Knowledge and Data Engineering, vol. 19, No. 11, November 2007, pp. 1541-1556.*

Automatic change detection of artificial objects in multitemporal high spatial resolution remotely sensed imagery;Jianwei Ma ; Zhongming Zhao ; Ge Zhao ; Ping Tang;Geoscience and Remote Sensing Symposium, 2003. IGARSS '03. Proceedings. 2003 IEEE Inter;vol. 5; Dig Obj Id: 10.1109/IGARSS.2003.1294781; Pub Year:2003 , pp. 3356-3358 vol. 5.*

Trajectory planning for human host tracking and following of slave mobile robot on service-related tasks; Chin-Lung Chen ; ChihChung Chou ; Feng-Li Lian;Robotics and Biomimetics (ROBIO), 2011 IEEE International Conference on Digital Object Identifier: 10.1109/ROBIO.2011.6181666; Publication Year: 2011 , pp. 2419-2420.*

Positioning accuracy of an automatic scanning system for GPR measurements on concrete structures; Trela, C. ; Kind, T. ; Schubert, M.; Ground Penetrating Radar (GPR), 2012 14th International Conference on; Digital Object Identifier: 10.1109/ICGPR.2012.6254879; Publication Year: 2012 , pp. 305-309.*

Map-reduce for calibrating massive bus trajectory data ; Dapeng Li ; Yu Haitao ; Xiaohua Zhou ; Mengdan Gao ITS Telecommunications (ITST), 2013 13th International Conference on; Digital Object Identifier: 10.1109/ITST.2013.6685519 Publication Year: 2013 , pp. 44-49.*

Evaluating connectivity between marine protected areas using CODAR high-frequency radar; Zelenke, B. et al. ;Oceans 2009, MTS/IEEE Biloxi—Marine Technology for Our Future: Global and Local Challenges;Pub Year 2009 , pp. 1-10.*

* cited by examiner

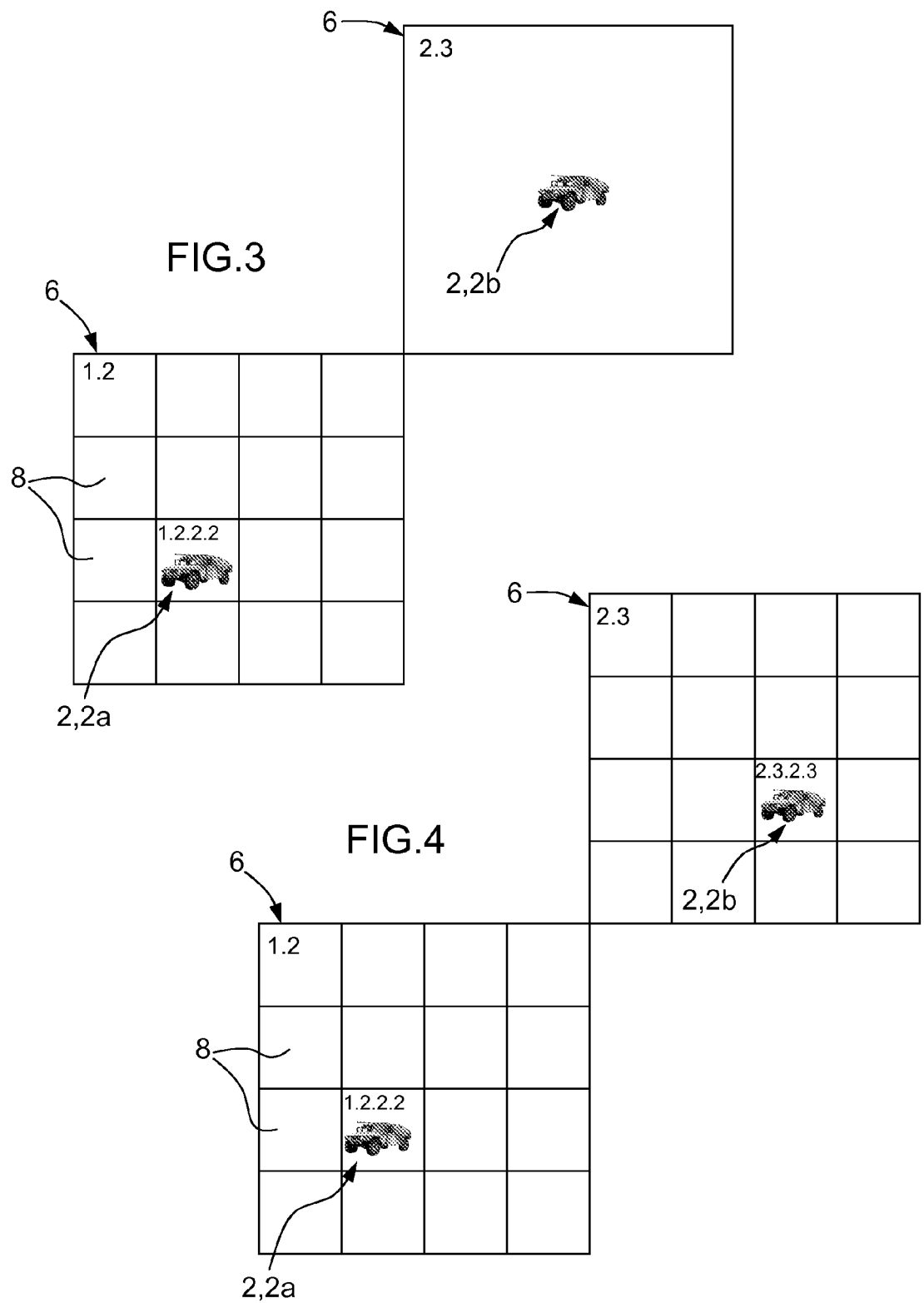

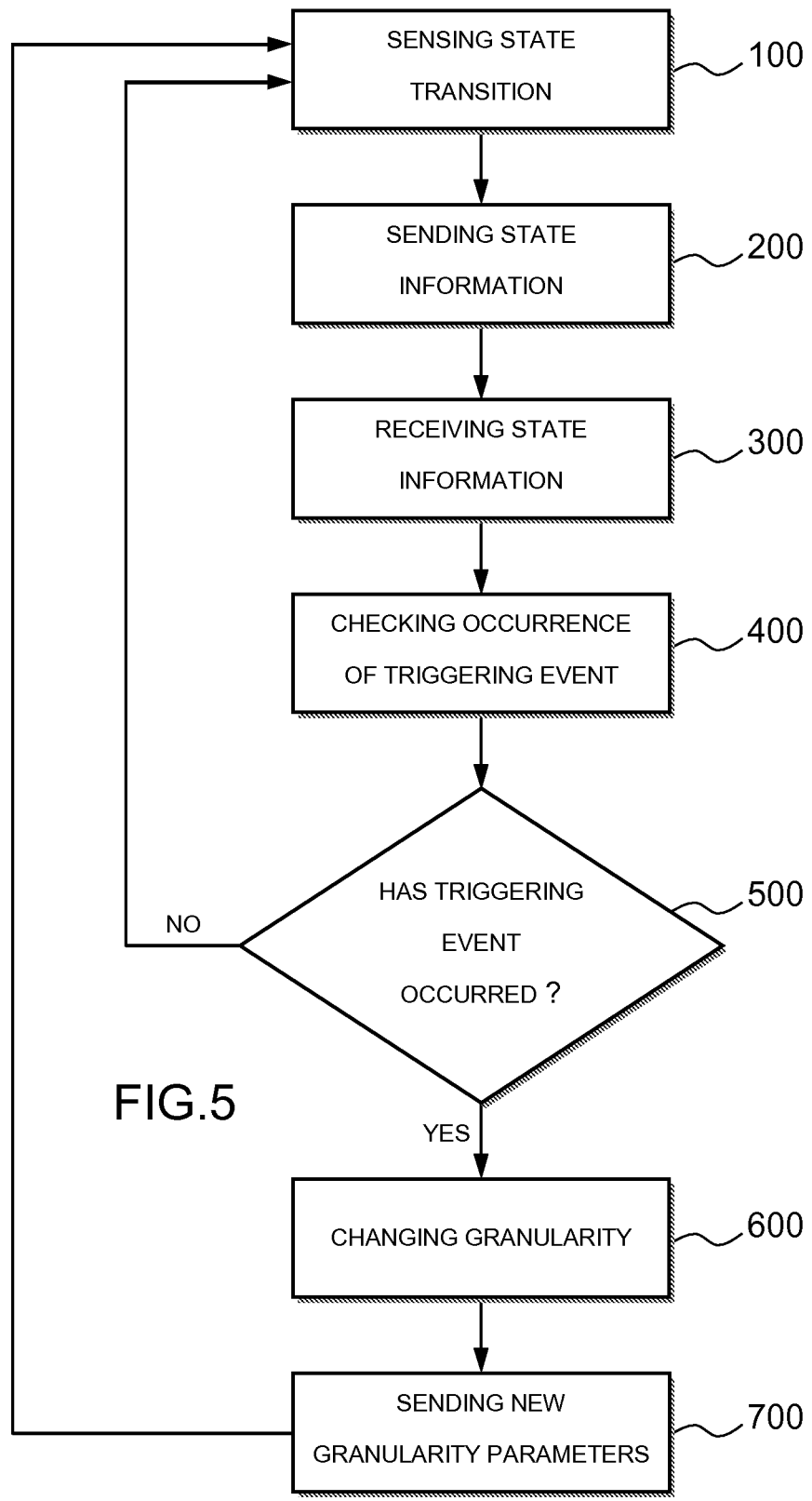

METHOD FOR TRACKING MOVING ENTITIES

FIELD OF THE INVENTION

The invention generally relates to the tracking of entities such as vehicles (cars, aircrafts), mobile phones or other devices, or even people. Numerous applications use geolocation services: fleet management, traffic monitoring/regulation, advertising, security, etc.

BACKGROUND OF THE INVENTION

Location based services (LSB) such as traffic monitoring/regulation commonly use the GPS (Global Positioning System) to locate and track vehicles in a geographic area. One vehicle location method and system using GPS for collision avoidance purpose is disclosed in U.S. Pat. No. 5,450,329 to Tanner. One method for undertaking context-dependent actions based upon GPS service is disclosed in US 2006/0129309 (Alewine).

However the known techniques for tracking moving entities, because they are based upon sophisticated and precise positioning systems (typically GPS), require important processing power and large network architectures, which are generally over-dimensioned vis-à-vis the end-task, typically traffic information or routing services to be delivered to the subscribers.

In addition, the known tracking techniques are generally passive, i.e. the moving entities are simply periodically requested to state variable parameters such as geographical coordinates (and, possibly, speed), in order for the core program (e.g. implemented on a server connected to a localization server) to calculate the predicted path of each entity.

It is the inventors' opinion that the known tracking techniques fail to efficiently track a population of entities, thereby reducing the capability of the tracking system to positively act on the context.

SUMMARY OF THE INVENTION

It is an object of the invention to provide an improved tracking method allowing processing power and/or network resources savings.

It is another object of the invention to provide an improved tracking method having enhanced capabilities to track and manage a population of entities.

The invention provides a method for tracking entities evolving in a monitored space having a metrics with at least one predetermined granularity, said method including repetition of the following operations:
- determining a current spatial and/or temporal state of the entities within said space, according to said metrics,
- checking occurrence of a triggering event in connection with said state,
- upon occurrence of said triggering event, changing granularity of the monitored space for at least one entity.

The invention also provides a tracking system, a computer program, and an application of the tracking method as further defined in the claims.

The above and other objects and advantages of the invention will become apparent from the detailed description of preferred embodiments, considered in conjunction with the accompanying drawings.

BRIEF DESCRIPTION OF THE DRAWINGS

FIG. 3 is a schematic diagram illustrating a monitored area using one granularity.

FIG. 4 is a schematic diagram illustrating a monitored area using another granularity.

FIG. 5 is a flow chart of a tracking method in accordance with an embodiment of the invention.

DETAILED DESCRIPTION

Figure 1:
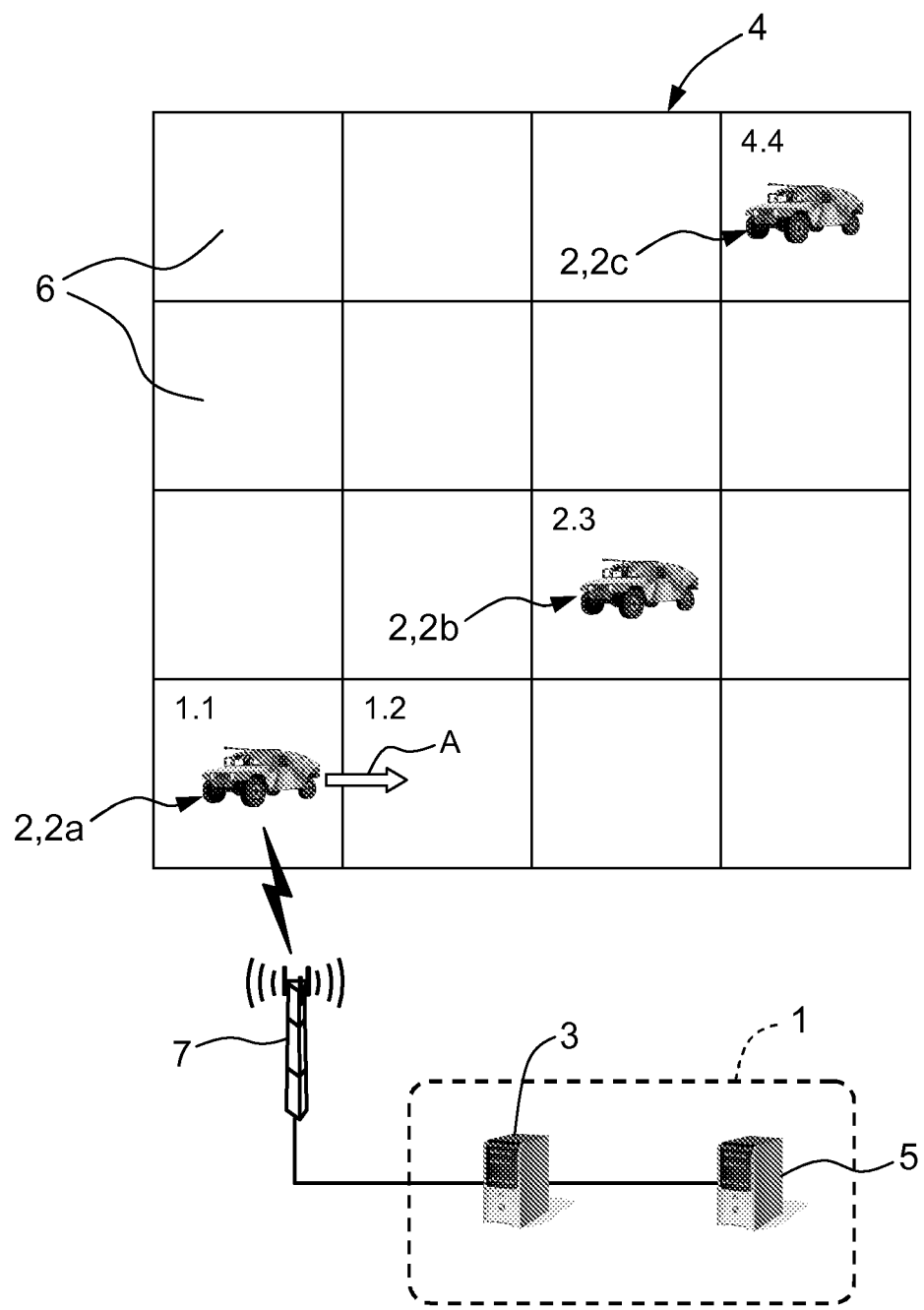
FIG. 1 and FIG. 2 are schematic diagrams illustrating a system according to an embodiment of the invention, applied to traffic regulation of terrestrial vehicles, showing two different vehicle positions.
Figure 2:
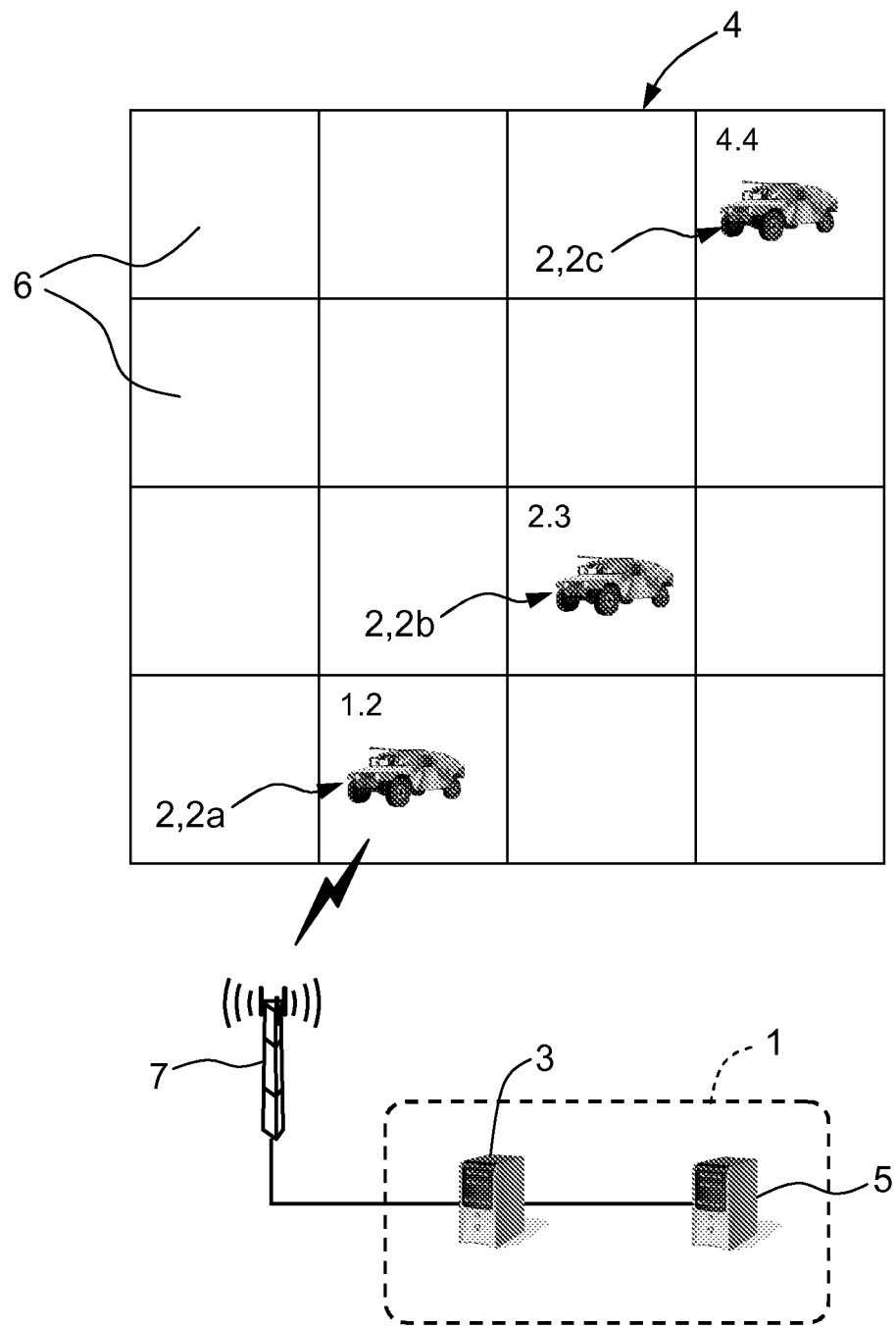

A system 1 for tracking entities 2 evolving in a predetermined monitored space is shown on FIG. 1 and FIG. 2

It should be noted that the monitored space may be of various topology and include spatial and/or temporal dimensions. It might be one-dimensional, such as a railway or a highway, two-dimensional, such as a road network, tri-dimensional, such as air, or even four-dimensional if time is also taken into account.

It should also be noted that the invention may be applied to any type of entities, including machines (such as cars, vans, trucks, trains, aircrafts, etc.) living bodies, as a whole (animals, human beings e.g. considered as pedestrians) or as a part (such as a biological cell).

In the depicted example, the monitored space is a geographical two-dimensional area or surface which may be plane or non-plane. Entities 2 are terrestrial vehicles moving on this surface.

The system 1 includes:
- an application server 3 wherein a computerized model 4 of the monitored space is memorized,
- and a communication server 5 connected to the application server 3 and configured to manage communication with the moving entities 2.

The computerized model 4 of the space has a metrics according to which the state (geographical and/or temporal) of each entity 2 within the space may be determined.

The metrics is based on a subdivision of the space in cells of a predetermined size, which size defines the granularity of the space, which granularity may be either locally or globally adjusted (i.e. increased or decreased) in response to a triggering event related to the state of the entities 2 within the space, as will be disclosed hereinafter.

Depending upon the topology of the monitored space, the cells may have:
- a predetermined length (in a one-dimensional or 1-D topology),
- a predetermined surface (in a bi-dimensional or 2-D topology),
- a predetermined volume (in a tri-dimensional or 3-D topology)

and/or a predetermined time value or time-related value (such as speed) in a time-dependent topology.

In the two-dimensional example depicted in FIG. 1 and FIG. 2, the computerized model 4 of the monitored 2-D area is divided in cells 6 of a predetermined surface.

Each cell 6 is identified through a unique identifier such as a number or address. In the depicted example of FIG. 1 and FIG. 2, each 2-D cell 6 may be identified through a combination of numbers of the X.Y type where X is an abscissa and Y an ordinate.

In order for communications to be set up between the communication server 5 and the moving entities 2, each entity 2 is provided with a communication agent suitable for transmitting/receiving information through the air interface, e.g. to/from a base station 7 or a mesh of base stations located on the geographical area and linked to the communication server 5, as in an ordinary mobile telephony system. More specifically, the communication agent may be implemented in a mobile phone having access to a mobile telephony network and suitable for exchanging data in addition to voice.

Each entity 2 is also provided with a location controller configured to sense at step 100 a transition of the state of the entity 2 within the space.

In the 2-D embodiment depicted on FIG. 1 and FIG. 2, this transition is sensed when the entity enters a new cell 6, the location controller being configured to sense the identifier of the cell 6 where the entity 2 is currently present or entering to, as the entity 2 is moving.

Sensing the identifier of a cell 6 may be achieved physically e.g. by means of a punctual wireless communication between a sensor implemented in the entity 2 and a fixed station installed within or at the boarder of each cell 6.

In a preferred embodiment however, sensing the identifier of the cell 6 is achieved by calculation. More precisely, a calculator connected to—or implemented in—the communication device of the entity 2 may:
sense the current position of the entity 2 e.g. by means of a triangulation method based on data received from several base stations within a mobile communication network, or by means of a GPS transceiver installed within the entity 2,
consequently map the sensed position of the entity 2 within the computerized model 4 of the monitored space (taking the current granularity into account), thereby identifying the cell 6 where the entity 2 is currently present or entering to.

Each time the entity 2 enters a new cell 6 of the monitored space, the entity 2 identifies the new cell 6 (for example as disclosed hereabove in a 2-D topology) and sends the communication server 5, at step 200, information relating to the current spatial and/or temporal state of the entity 2. In the depicted 2-D embodiment, the entity 2 sends the communication server 5 both an entity identifier and the cell identifier. This information is relayed to the application server 3.

Such a situation is disclosed on FIG. 1 and FIG. 2, where the monitored area is simply schematized as a square grid 4 divided in 16 square cells 6 identified from 1.1 (bottom left) to 4.4 (top right) corresponding to the lowest map scale. Three vehicles 2a, 2b, 2c are present in the monitored area, in cells 1.1, 2.3 and 4.4 respectively. Vehicle 2a initially present in cell 1.1 is moving to cell 1.2, as shown by arrow A. On FIG. 2, vehicle 2a has moved from cell 1.1 to cell 1.2.

Once informed of the new cell identifier in connection with the originating tracked entity 2, the application server 5 accesses one or more databases including a list of the tracked entities 2 and the corresponding current granularities of the monitored space 4, peculiar to each entity 2.

Each time the application server 5 receives at step 300 information in connection with the state of the tracked entities 2, the application server 5 checks at steps 400 and 500 occurrence of a triggering event in connection with the state of the entities 2 according to the metrics of the monitored space.

The triggering event is the transition of the current state of the entities 2, considered either individually, in groups or globally, to another state being closer to, or remoter from, a predetermined target state. In one embodiment, the triggering event may be the transition of the current state to a predetermined target state, or on the contrary the transition of the current state to a state different from a predetermined target state.

The target state of the entities may be a predetermined position of the entities within the monitored space. It may also be a configuration where the entities have a predetermined linear or rotational speed or a predetermined orientation. It may also be a configuration where a predetermined number of entities are simultaneously present in the same cell. The target state may further be a configuration where certain cells are empty. Other configurations may be imagined within the scope of the invention.

More precisely, in the example where the state of each entity 2 includes the identifier of the new cell 6 the entity 2 is entering to, the application server 5 may calculate the distance between the new cell 6 and other cells 6 in each of which at least one tracked entity 2 is deemed to be present of entering to, depending upon the granularities peculiar to each tracked entity 2. In this particular example, the triggering event may be this calculated distance becoming lower or greater than a predetermined distance.

In the example depicted on FIG. 2, the application server 5 calculates the distance between cells 1.2 (which an entity has just entered), 2.3 and 4.4.

Upon occurrence of the triggering event, the application server 5 changes at step 600 the granularity of the space for at least one tracked entity 2. The granularity may be changed for a selected group of entities 2, or even for all entities 2, depending upon the needs.

In one embodiment, as soon as the calculated distance is lower than the predetermined distance, meaning that higher monitoring accuracy is needed at least locally, the granularity (which in the example depicted on FIG. 1 to FIG. 4 is a map scale) of the monitored space for the tracked entity 2 is increased. In other terms, the application server 5 zooms in the cell 6 where the tracked entity 2 is currently present or entering to. On the contrary, as soon as the calculated distance is greater than the predetermined distance, meaning that high accuracy is no longer needed, the granularity of the monitored space for the tracked entity 2 is decreased. In other words, the application server 5 zooms out from the cell where the tracked entity 2 is currently present or entering to. The new granularity, peculiar to the tracked entity 2 or to at least a group thereof, is memorized in the corresponding database.

In a first configuration, granularity change is applied only to the entity 2 which has just reported a cell change. Such a configuration is illustrated on FIG. 3, wherein cells 1.2 and 2.3 are supposed to be separated by a distance lower than the triggering distance. Cell 1.2, where vehicle 2a has reported to having moved to, is sub-divided into sub-cells 8 of lower surface area, whereas cell 2.3, where another vehicle 2b is deemed to be present by the time vehicle 2a has reported a cell change, undergoes no granularity change.

In a second configuration, map scale change is applied to a group of entities or to all entities involved in the triggering event, i.e. entities present in cells the distance between which is smaller (respectively greater) than a predetermined distance. Such a configuration is illustrated on FIG. 4. Cell 1.2, where vehicle 2a has just reported to having moved to, is sub-divided into sub-cells 8 of lower surface area, and so is cell 2.3 where another vehicle 2b is deemed to be present by the time vehicle 2a has reported a cell change.

Granularity change, such as cell sub-division in the depicted example, may be conducted through a recursive spatial division technique, as illustrated on FIG. 3 and FIG. 4, meaning that each sub-cell 8 is identical in proportions with the originating cell 6 (also called super-cell) from which it is derived, and that each cell or super-cell 6 contains an integer number of subsequent sub-cells 8.

Whichever the granularity, the parameters defining the granularity (e.g. the size of the corresponding cell 6 or sub-cell 8) are returned at step 700 by the application server 5 to the entity 2 via the communication server 3, thereby informing the concerned entity 2 of the granularity change.

It shall be noted that the new parameters may be sent either over a unicast message peculiar to each moving entity 2 having reported a cell change, or over a broadcast message sent to all entities 2 deemed to be present in a same cell 6 or in any sub-cell 8 belonging to a same super-cell 6 and for which the same granularity change applies.

The new granularity is memorized by or within the or each entity 2, whereby the entity tracking process is resumed according to the granularity or granularities, the process including repetition of the steps 100-700 disclosed hereinbefore for each entity 2.

Several steps of the tracking method may be implemented as a computer program implemented on a processing unit of the application server 5, said program including code sections for performing corresponding instructions, namely:
  determining a current spatial and/or temporal state of entities 2 evolving within the monitored space,
  checking occurrence of the triggering event in connection with said state,
  upon occurrence of the triggering event, changing granularity of the monitored space for at least one entity 2, possibly a group of entities 2 or even all of them.
  forming a message including new granularity parameters to be sent to the concerned entity or entities 2.

The tracking process may be applied simultaneously for all tracked entities 2.

It shall be noted that the tracking method and system disclosed hereinbefore may be successfully applied to
  traffic monitoring and/or regulation in road, rail, maritime or air transport, or a combination thereof,
  people surveillance,
  promising medical technologies, such as the monitoring of nanomachines moving within the human body.

The disclosed tracking method and system provide substantial processing power savings, since granularity of the monitored space may be adjusted when required, e.g. depending upon the mutual proximity of the moving entities 2: only when entities 2 are close enough to one another is the map scale increased, whereas it is decreased when entities are sufficiently far away from one another. In a road traffic application, such a system and method provide efficient and economic traffic jam detection, and also traffic jam and/or accident prevention if entities 2 are suitably informed of the traffic density or provided with other useful information like an alternate route which may be calculated across free cells of the monitored space.

The invention claimed is:

1. A method for tracking moving entities in a monitored space subdivided into a plurality of cells having a first predetermined granularity, said method including repetition of the following operations:
  transmitting information from said moving entities to a server;
  determining at said server at least in part from said transmitted information a current spatial and/or temporal state of the moving entities within said monitored space;
  checking said transmitted information for occurrence of a triggering event in connection with said state;
  upon occurrence of said triggering event, changing granularity of at least one of the plurality of cells of the monitored space to a second predetermined granularity while maintaining the first granularity for at least one other of the plurality of cells of the monitored space; and
  tracking said moving entities in the monitored space in accordance with said changed granularity.

2. A method according to claim 1, wherein the triggering event is a transition of the state of the entities within the monitored space to another state being closer to, or more remote from, a predetermined target state.

3. A method according to claim 1, wherein determining the current state of one of the moving entities comprises identifying a cell where the one of the moving entities is deemed to be currently present or entering into.

4. A method according to claim 3, wherein checking occurrence of a triggering event includes calculation of a distance between at least one of the plurality of cells and at least one other of the plurality of cells in which at least one of the moving entities is deemed to be currently present or entering into.

5. A method according to claim 4, wherein the triggering event is the calculated distance being lower or greater than a predetermined distance.

6. A method according to claim 5, wherein granularity is increased or decreased if the calculated distance is lower or, respectively, greater than the predetermined distance.

7. A method according to claim 3, wherein granularity change is conducted through a recursive spatial division technique of the cells.

8. A system for tracking moving entities in a monitored space subdivided into a plurality of cells having a first predetermined granularity, said system including:
  an application server configured to perform the following functions:
    determining a current spatial and/or temporal state of the moving entities within said monitored space;
    checking occurrence of a triggering event in connection with said state; and
    upon occurrence of said triggering event, changing granularity of at least one of the plurality of cells of the monitored space to a second predetermined granularity while maintaining the first granularity for at least one other of the plurality of cells of the monitored space; and
  a communication server connected to the application server and configured to manage communications with the moving entities, said communications including:
    contextual information sent by the moving entities in connection with their current spatial and/or temporal state within the monitored space; and
    granularity parameters of the plurality of cells of the monitored space sent by the communication server.

9. A computer program product comprising a non-transitory computer readable medium carrying program code which when executed on a processing unit of a computer will cause the following steps to be performed:
  determining a current spatial and/or temporal state of moving entities within a monitored space subdivided into a plurality of cells having a first predetermined granularity;
  checking occurrence of a triggering event in connection with said state;
  upon occurrence of said triggering event, changing granularity of at least one of the plurality of cells of the monitored space to a second predetermined granularity while maintaining the first granularity for at least one other of the plurality of cells of the monitored space; and forming a message including new granularity parameters to be sent to at least one moving entity.

10. A method according to claim 1, wherein each of said entities is a vehicle.

11. A computer program product according to claim 9, wherein said program code when executed further causes said new granularity parameters to be stored in a database.

12. A method for tracking entities moving in a monitored space subdivided into a plurality of cells having a first predetermined granularity, said method including repetition of the following operations:
   transmitting information from each of said entities to a server;
   determining at said server at least in part from said transmitted information at least one of a current location within said monitored space and a current velocity of movement within the plurality of cells of said monitored space of each of the entities;
   checking said transmitted information for occurrence of a triggering event in connection with said location and/or velocity of at least one of said entities,
   upon occurrence of said triggering event, changing granularity of at least one of the plurality of cells of the monitored space to a second predetermined granularity while maintaining the first granularity for at least one other of the plurality of cells of the monitored space; and
   tracking said entities in the monitored space in accordance with said changed granularity.

13. A method according to claim 12, wherein said entities are vehicles.

14. A method according to claim 10, wherein determining the current location of an entity comprises identifying the one of the plurality of cells where the entity is deemed to be currently present or entering into.

15. A method according to claim 14, wherein checking occurrence of a triggering event includes calculation of a distance at least one of the plurality of cells and the at least one of the plurality of cells in which at least one entity is deemed to be currently present or entering into.

16. A method according to claim 15, wherein the triggering event is a calculated distance being lower or greater than a predetermined distance.

17. A method according to claim 16, wherein granularity is increased or decreased if the calculated distance is lower or, respectively, greater than the predetermined distance.

* * * * *